(12) United States Patent
Murphy

(10) Patent No.: US 6,554,939 B1
(45) Date of Patent: Apr. 29, 2003

(54) CONTAINER AND METHOD OF FORMING THE CONTAINER

(75) Inventor: James C. Murphy, Chardon, OH (US)

(73) Assignee: Pentair Pool Products, Inc., Sanford, NC (US)

( * ) Notice: Subject to any disclaimer, the term of this patent is extended or adjusted under 35 U.S.C. 154(b) by 116 days.

(21) Appl. No.: 09/685,884

(22) Filed: Oct. 10, 2000

(51) Int. Cl.⁷ .................................................. B29C 2/00
(52) U.S. Cl. ...................... 156/184; 156/173; 156/175; 156/198; 156/443; 156/446; 220/589
(58) Field of Search ................................. 156/73.2, 172, 156/173, 175, 169, 184, 186, 187, 195, 188, 425, 429, 443, 446, 431; 220/588, 584, 589, FOR 126, FOR 165; 242/159, 160.1, 173, 176, 178, 435, 435.1, 436, 443, 448

(56) References Cited

U.S. PATENT DOCUMENTS

| | | | |
|---|---|---|---|
| 2,995,011 A | 8/1961 | Kimmel | |
| 3,655,085 A | 4/1972 | Aleck | |
| 4,123,307 A | * 10/1978 | Lemelson | ................... 156/172 |
| 4,363,687 A | 12/1982 | Anderson | |
| 4,453,995 A | * 6/1984 | Morrisey | ................... 156/172 |
| 4,588,106 A | 5/1986 | Stark, Sr. et al. | |
| 4,614,279 A | 9/1986 | Toth et al. | |
| 4,671,831 A | 6/1987 | Mohan | |
| 4,778,073 A | 10/1988 | Ehs | |
| 4,783,232 A | * 11/1988 | Carbone et al. | ............. 156/172 |
| 4,785,956 A | 11/1988 | Kepler et al. | |
| 5,129,540 A | 7/1992 | Palazzo | |
| 5,287,987 A | * 2/1994 | Gaiser | ........................ 220/589 |
| 5,368,073 A | 11/1994 | Murphy | |
| 5,388,720 A | 2/1995 | Murphy | |
| 5,484,079 A | 1/1996 | Carter et al. | |
| 5,499,739 A | 3/1996 | Greist, III et al. | |
| 5,526,994 A | 6/1996 | Murphy | |
| 5,556,497 A | 9/1996 | Murphy et al. | |
| 5,806,705 A | 9/1998 | Herald, Jr. et al. | |
| 5,817,203 A | 10/1998 | Moser | |
| 5,900,107 A | 5/1999 | Murphy et al. | |
| 6,074,595 A | 6/2000 | Eisberg | |

* cited by examiner

Primary Examiner—Deborah Jones
Assistant Examiner—Vivek Koppikar
(74) Attorney, Agent, or Firm—Pearne & Gordon LLP

(57) ABSTRACT

An improved container is formed by attaching plates to outer side surface areas on opposite end portions of a liner with adhesive. The liner is supported for rotation about an axis which extends through the end portions of the liner and through the plates. The liner is rotated under the influence of torque transmitted to the liner through at least one of the plates and the adhesive attaching the one plate to the liner. Flexible material, which may be strands of continuous glass fibers impregnated with a thermosetting resin, is wound around the liner. As the flexible material is wound around the liner, the flexible material is wound over the plates at the opposite end portions of the liner. The surface areas, to which the plates are attached at opposite ends of the liner, are free of openings to the interior of the liner.

17 Claims, 2 Drawing Sheets

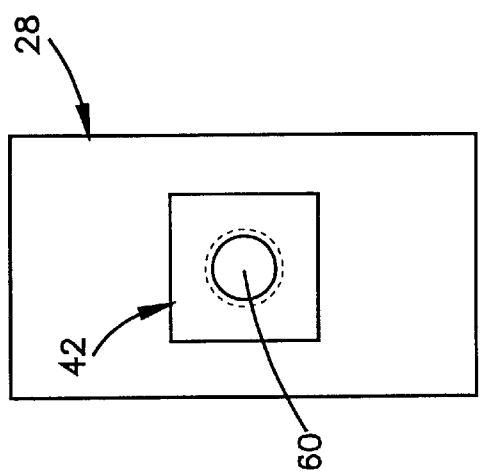
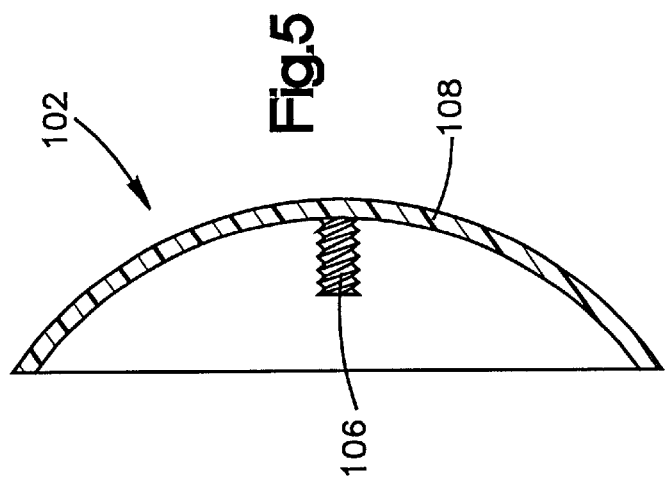
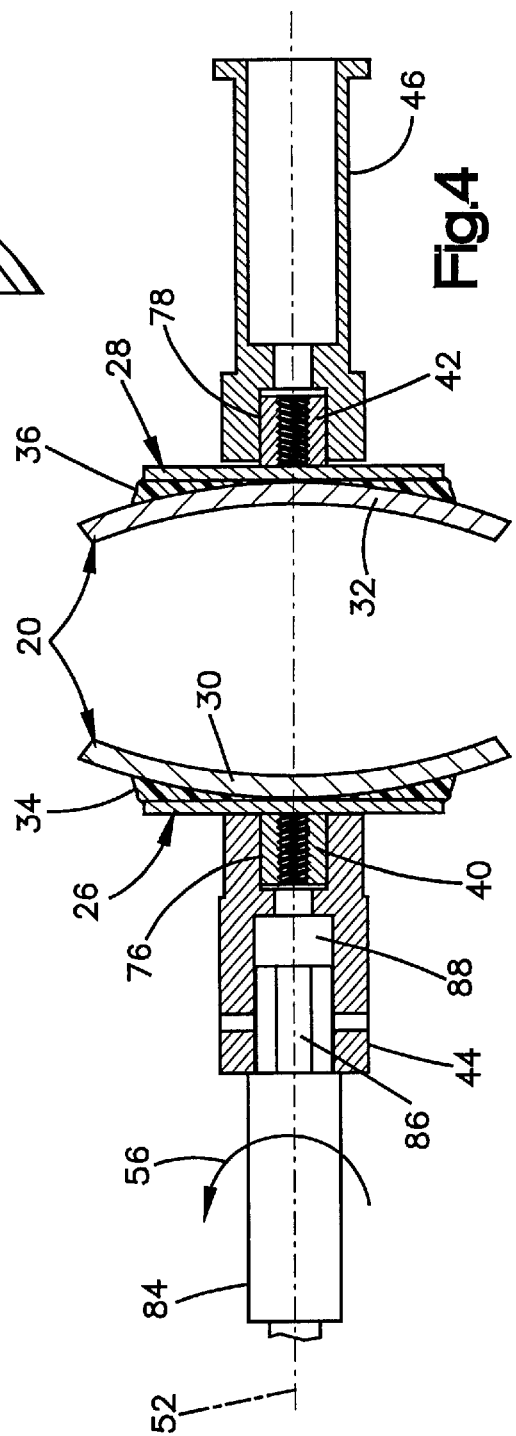

CONTAINER AND METHOD OF FORMING THE CONTAINER

BACKGROUND OF THE INVENTION

The present invention relates to a new and improved container and method of forming the container. The container includes a liner around which flexible material is wound.

Filament wound plastic pressure vessels have previously been formed by winding strands or roving of fibers, particularly continuous glass fibers, around a blow-molded or rotationally cast thermoplastic liner or a laid-up thermoset liner. During winding of the liner with the filament, the liner may be supported by a winding pole. The liner is formed with holes at opposite ends of the liner. The winding pole is inserted through the holes at opposite ends of the liner. The liner is connected with the winding pole. The winding pole and liner are rotated together during winding of filament around the liner.

In addition, filament wound vessels have previously been formed by inserting drive lugs into holes in opposite ends of a liner. Torque is transmitted through the drive lugs to the liner to rotate the liner during the winding of filaments around the liner.

These methods of forming a filament wound pressure vessel require the making of holes in opposite ends of the liner. When the apparatus utilized to support and rotate the liner during winding of the filament around the liner is removed from the liner, the holes must either be patched or fitted with bulkhead fittings in order to provide a pressure tight seal. However, there is a potential source of leakage at the locations where the liners are patched or closed with bulkhead fittings. In addition, patching or closing the holes at opposite ends of the liner increases the cost of making the filament wound vessel.

SUMMARY OF THE INVENTION

In accordance with one of the features of the present invention, the prior art problem of sealing openings formed in a liner to enable the liner to be rotated during winding of filament around the liner is eliminated. This is accomplished by eliminating the formation of openings in the liner to accommodate apparatus to rotate the liner during winding of the filament. Therefore, filament wound containers constructed in accordance with the present invention have very few or no leakage problems.

In accordance with the present invention, during forming of a container, plates are attached to opposite end portions of a liner with adhesive. The liner surfaces to which the plates may be attached are free of through openings to the interior of the liner. The liner is supported for rotation about an axis which extends through the plates at opposite ends of the liner. The liner is rotated under the influence of torque which is transmitted to the liner through at least one of the plates and adhesive attaching the one plate to the liner.

During rotation of the liner, flexible material is wound around the liner. The flexible material is wound over the plates at the opposite ends of the liner. Covers are advantageously connected with the plates to cover the areas where the liner was supported during winding of the flexible material around the liner.

BRIEF DESCRIPTION OF THE DRAWINGS

The foregoing and other features of the present invention will become more apparent upon a consideration of the following description taken in connection with the accompanying drawings wherein:

FIG. 3 is a plan view illustrating the construction of the plate of FIG. 2;

FIG. 4 is a fragmentary schematic sectional view illustrating the manner in which a liner is rotatably supported by members which engage plates at opposite ends of the liner during winding of flexible material around the liner; and FIG. 5 is a sectional view illustrating a decorative cover which is connected with a plate on the container of FIG. 1.

DESCRIPTION OF A SPECIFIC PREFERRED EMBODIMENT OF THE INVENTION

Figure 1:
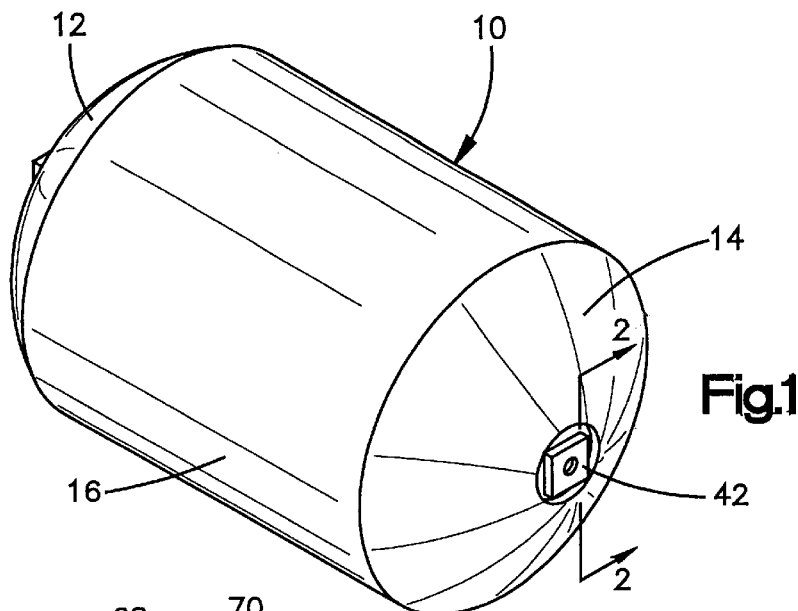
FIG. 1 is a schematic pictorial illustration of a filament wound container for holding fluid.

A filament wound container 10, that is, a pressure vessel, for holding fluid, such as a liquid and/or gas, is illustrated in FIG. 1. The container 10 has a pair of hemispherical or ellipsoidal dome end portions 12 and 14 which are interconnected by a cylindrical central portion 16. Of course, the container 10 could have a different configuration if desired. For example, the container 10 could be spherical. Alternatively, the container 10 could be cylindrical with flat end sections.

The container 10 includes a liner 20 (FIG. 2) having the same configuration as the container. Thus, the liner 20 includes a pair of dome end portions, corresponding to the end portions 12 and 14 of the container 10, which are interconnected by a cylindrical central portion, corresponding to the central portion 16 of the container. The liner 20 may be blow molded or rotationally cast from a suitable thermoplastic resin.

Although the illustrated liner 20 is integrally formed as one piece, the liner may be formed by a plurality of interconnected pieces. For example, the dome end portions of the liner may be formed separately from and subsequently connected with, a cylindrical central portion. Alternatively, the liner may be formed as two halves which are interconnected at a central joint. It should be understood that the liner 20 could have any one of many different configurations. Thus, the liner 20 could be either spherical, cylindrical, or of some other geometry.

A reinforcing layer 22 (FIG. 2) is provided over the liner 20 to form the outside of the container 10. The reinforcing layer 22 has the same configuration as the liner 20. The reinforcing layer is applied by conventional filament winding techniques which include winding an flexible material around the outside of the liner 20.

The flexible material which is wound around the outside of the liner 20 and forms the reinforcing layer 22 may be formed by glass filament composed of a number of fibers which have been impregnated with a liquid thermosetting resin. The filaments may comprise bands of glass, aramid, carbon filaments, and/or the like. The general construction of the container 10 may be similar to that disclosed in U.S. Pat. Nos. 5,526,994; 5,368,073; and/or 4,614,279. The disclosures in the aforementioned patents are hereby incorporated herein by this reference thereto.

It should be understood that the container 10 could have a different construction if desired. For example, the liner 20 could be formed of metal rather than a reinforced plastic. The reinforcing layer 22 could be formed by winding strands or tapes of any one of many different materials around the outside of the liner.

In accordance with a feature of the present invention, a pair of plates 26 and 28 (FIG. 4) are connected with opposite dome end portions 30 and 32 of the liner 20 by layers 34 and 36 of adhesive. The adhesive layers 34 and 36 securely attach the identical metal plates 26 and 28 to axially opposite ends of the liner 20. The strength of the connection formed by adhesive layers 34 and 36 between the plates 26 and 28 and the liner 20 is such that the material of the liner will rupture under the influence of force transmitted to the liner through the plates 26 and 28 before the adhesive layers 34 and 36 will rupture. This relatively strong connection between the plates 26 and 28 and the liner 20 enables relatively large forces to be transmitted from the plates 26 and 28 through the adhesive layers 34 and 36 to axially opposite ends of the liner 20 during formation of the reinforcing layer 22 around the outside of the liner 20.

Figure 2:
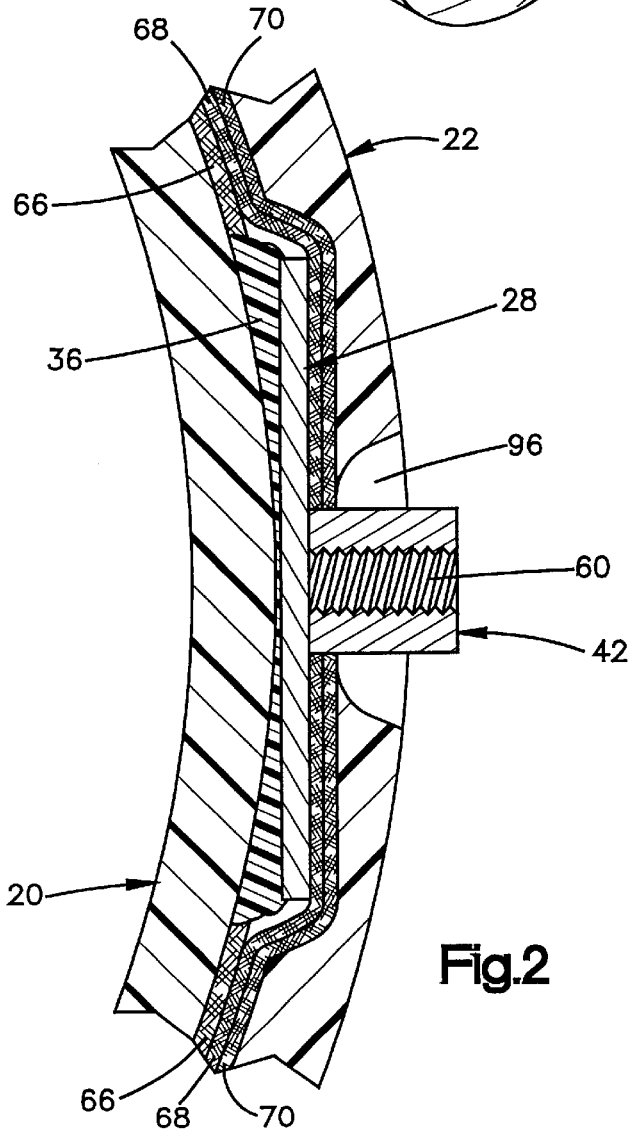
FIG. 2 is a fragmentary sectional view, taken generally along the line 2—2 of FIG. 1, schematically illustrating the manner in which a plate is attached to an end portion of a liner by adhesive and in which a winding of flexible material overlies the plate.

In accordance with another feature of the present invention, the plates 24 and 26 are provided with drive lug projections 40 and 42 (FIG. 4). The projections 40 and 42 are engaged by support members 44 and 46. The support members 44 and 46 rotatably support the liner 20 during winding of the flexible material around the liner to form the reinforcing layer 22 (FIG. 2).

The secure bonds provided by the adhesive layers 34 and 36 (FIG. 4) enable the relatively heavy liner 20 to be supported by the members 44 and 46. In one specific instance, the liner 20 had a weight of 100 pounds or more. This specific liner had a diameter of more than three feet and a length of more six feet. It should be understood that the foregoing specific dimensions and weight for one specific liner 20 have merely been set forth herein for purposes of clarity of description and it is contemplated that the liner may be formed with different weights and/or dimensions if desired.

In accordance with one of the features of the present invention, it is not necessary to form openings in the liner 20 to receive apparatus which supports the liner during winding of the layer 22 onto the liner. The plates 26 and 28 are attached to imperforate areas on the side wall of the liner 20 by the layers 34 and 36 of adhesive. Therefore, the end portions 30 and 32 of the liner 20 are free of undesired openings. This eliminates the necessity of sealing openings required only to support the liner during winding of the layer 22 and the possibility of subsequent leakage.

Although the formation of openings in the liner 20 for the purpose of supporting the liner during winding of the layer 22 has been eliminated, openings may be formed in the end portions 30 and 32 for other purposes. Thus, openings may be provided in the end portion 30 and/or 32 for necessary bulkhead fittings or other purposes. The undesired openings which have previously been formed in the end portions 30 and 32 of the liner 20 to accommodate rotation of the liner during the winding of filament around the liner are eliminated.

During winding of the reinforcing layer 22 of flexible material around the liner 20, the liner 20 is rotated about its longitudinal central axis 52 (FIG. 4). The plates 26 and 28 and drive lug projections 40 and 42 have central axes which are coincident with the central axis 52 of the liner 20. The central axes of the support members 44 and 46 are also coincident with the central axis 52 of the liner 20.

Drive forces, indicated schematically by the arrow 56 in FIG. 4, are transmitted from a suitable source of power through the support member 44 and projection 40 to the plate 26. The drive forces are transmitted from the plate 26 through the layer 34 of adhesive to the end portion 30 of the liner 20. Although only the left (as viewed in FIG. 4) support member 44 is driven, it is contemplated that the right support member 46 could also be driven if desired.

During rotation of the liner 20, flexible material, which may be a continuous filament, such as a glass filament composed of a number of fibers, is wrapped around the liner 20. The continuous filament is impregnated with a liquid thermosetting resin which hardens to form the reinforcing layer 22. As the liner 20 is rotated and covered with a winding of flexible material, the forces for supporting and rotating the liner are transmitted to the liner through the plates 26 and 28 and layers 34 and 36 of adhesive.

The plate 28 (FIGS. 2 and 3) has a rectangular configuration. However, it is contemplated that the plate 28 could be formed with a circular configuration if desired. The illustrated plate 28 is flat. However, the plate 28 could have a curvature to match the curvature of the end portion 32 of the liner 20. Although the plate 28 is formed of steel, it is contemplated that it could be formed of a different material, for example, a polymeric material.

The drive lug projection 42 (FIGS. 2 and 3) is welded to the center of the plate 28. However, the projection 42 could be connected with the plate 28 in a different manner if desired. For example, the projection 42 could extend through an opening in the plate 28 and be deformed to grip the plate.

The drive lug projection 42 has a polygonal configuration to facilitate gripping of the projection by the support member 46 (FIG. 4) and the transmission of force between the support member and the plate 28. Of course the drive lug projection 42 could have a different configuration if desired. For example, the projection 42 could have a hexagonal configuration or a cylindrical configuration.

The projection 42 has a central opening 60 which is internally threaded. The internal thread on the projection 42 is provided to enable a bolt or other externally threaded member (not shown) to securely interconnect the projection and support member 46. The bolt prevents the projection 42 from pulling out of a socket in the support member.

Although only the plate 28 and projection 42 are illustrated in FIGS. 2 and 3, the plate 26 and projection 40 have the same construction as the plate 28 and projection 42. The projection 40 is internally threaded to enable a retaining bolt to interconnect the projection and the support member 44 (FIG. 4).

When the liner 20 is to be wound with flexible material to form the reinforcing layer 22, the plates 26 and 28 are first connected with axially opposite ends of the liner 20. When this is to be done, thick layers of adhesive are applied to major side surfaces of the plates 26 and 28 opposite from the projections 40 and 42. This adhesive forms the layers 34 and 36 of adhesive. The adhesive is commercially available from Lord Corporation of Cary, N.C. and is a modified acrylic adhesive designated by number 406 and contains an accelerator designated by number 17. Of course, a different commercially available adhesive could be utilized if desired.

The plates 26 and 28, with layers of adhesive on the major side surfaces opposite from the projections 40 and 42, are positioned in engagement with opposite end portions 30 and 32 of the liner 20. A suitable frame or jig may be used to align the plates 26 and 28 with the central axis 52 (FIG. 4) of the liner 20. Alternatively, small recesses may be formed in the end portions 30 and 32 of the liner on the axis 52.

Pointed ends of small locating screws may extend from the sides of the plates 26 and 28 opposite from the projections 40 and 42 to engage the recesses and align the plates 26 and 28 with the axis 52.

The locations where the plates 26 and 28 are secured to the liner 20 are free of through openings between the interior and exterior of the liner. The absence of through openings to enable the liner to be supported during winding of flexible material around the liner minimizes the possibility of leakage. If openings were formed in the liner to accommodate known supports, in accordance with prior art practices, there would always be a possibility that seals for the openings could leak.

Once the plates 26 and 28 have been fixedly connected with opposite ends of the liner 20 by the layers 34 and 36 of adhesive, the area around the plates is built up to provide for a gradual tapering of the arcuate end portions 12 and 14 away from the projections 40 and 42. To provide for this tapered construction, a plurality of layers of fibrous mats 66, 68, and 70 (FIG. 2) are positioned at opposite ends of the liner 20. The fibrous mats 66, 68 and 70 may have any desired construction and configuration. A greater or lesser number of fibrous mats may be used if desired.

In one specific embodiment of the invention, the fibrous mat 66 is formed of randomly oriented lengths of chopped fibers bonded together with a suitable low solubility binder. This specific fibrous mat 66 has a rectangular opening which is approximately the same size as the rectangular plate 28. In this one specific embodiment of the invention, the rectangular plate 28 is a five-inch square plate. The mat 66 is also square and had a five-inch square center opening. The mat 66 has a square periphery with a dimension on each side of the square of approximately 10½ inches and was a six-ounce mat.

In the one specific embodiment of the invention referred to in the next preceding paragraph, the layer 68 of fibrous mat overlaps the plate 28 and has a square center opening with approximately two inches on a side. This specific mat 68 has a square periphery which is larger than the periphery of the mat 66. In this specific embodiment of the mat 68, the periphery is approximately 12½ inches on a side. The mat 66 is formed of 1.5-ounce material and is aligned with and extended outwardly from the mat 66.

In the one specific embodiment of the invention referred to in the two preceding paragraphs, the outermost mat 70 has the smallest square central opening of approximately 1⅜ inches. The mat 70 has the largest periphery and extended outward from the mats 66 and 68. This specific embodiment of the mat 70 had a periphery which was 14½ square. This particular mat 70 was formed of 1.5-ounce material.

It should be understood that the foregoing specific dimensions and weights of the mats 66, 68 and 70 have been set forth herein for purposes of clarity of description and not for purposes of limitation of the invention. It should also be understood that the mats 66, 68 and 70 could have a different configuration if desired. For example, the mats 66, 68 and 70 could have a circular configuration with circular central openings if desired. Although three mats 66, 68 and 70 are utilized in the specific embodiment of the invention illustrated in FIG. 2, a greater or lesser number of mats could be utilized if desired.

In the embodiment of the invention illustrated in FIG. 2, the plate 28 is flat and the domed end portion 14 of the liner 20 has an arcuate cross sectional configuration. This results in the layer 36 of adhesive being thicker adjacent to the periphery of the plate 28 and thinner adjacent to the center portion of the plate. If desired, the plate 28 could be formed with a curved configuration which matches the arc of curvature of the dome end portion 14 of the liner 20. This would result in the adhesive layer 36 having the same thickness throughout the extent of the adhesive layer. If this is done, it is believed that the number of layers 66, 68 and 70 of mat may be reduced.

It should be understood that the plate 26 is connected with the end portion 30 of the liner 20 in the same manner as the plate 28. The area around the plate 26 is built up with a plurality of layers of fibrous mats in the same manner as previously explained in conjunction with the plate 28. If desired, building up of the end portions 30 and 32 of the liner 20 with one or more layers of fibrous mat could be omitted.

The plates 26 and 28 are fixedly connected to surfaces on the end portions of the liner 20 which are free of openings. Thus, the areas where the layers 34 and 36 of adhesive engage the end portions 30 and 32 of the liner 20 are free of openings to the interior of the liner. This eliminates any possibility of leakage occurring at the locations where the liner 20 is supported during formation of the filament wound layer 22.

After end plates 26 and 28 have been mounted at opposite ends of the liner 20 and a desired number of layers of fibrous mat have been provided at both ends of the liner, the liner is supported for rotation about its central axis 52 by support members 44 and 46 (FIG. 4). The support members 44 and 46 have polygonal openings 76 and 78. The polygonal openings 76 and 78 form sockets which telescopically engage the projections 40 and 42 on the plates 26 and 28.

In the illustrated embodiment of the invention, the projections 40 and 42 have square configurations and the openings 76 and 78 in the support members 44 and 46 are square. However, it is contemplated that the projections 40 and 42 could have a different configuration. Of course if this was done, the openings 76 and 78 in the support members 44 and 46 would have a different configuration. For example, the projections 40 and 42 and the openings 76 and 78 could have a hexagonal configuration.

The support members 44 and 46 are fixedly connected with the projections 40 and 42 by suitable bolts (not shown). The bolts have head end portions disposed in the support members 44 and 46 and externally threaded shanks which engage internally threaded openings 60 in the projections 40 and 42. Of course, the support members 44 and 46 could be connected with the plates 26 and 28 in a different manner if desired.

A drive member 84 engages the support member 42. Thus, the drive member 84 has a hexagonal end portion 86 which extends into a hexagonal opening in the support member 44. The drive member 84 is rotated, as indicated schematically by the arrow 56 in FIG. 4.

Rotation of the drive member 84 rotates the support member 44. This results in torque being transmitted from the support member 44 through the projection 40 to the plate 26. The torque is transmitted from the plate 26 through the layer 34 of adhesive to the liner 20. This torque is effective to rotate the liner 20 about the axis 52. Although only the support member 44 is driven in the embodiment of the invention illustrated in FIG. 4, it is contemplated that both of the support members 44 and 46 could be driven if desired.

As the liner 20 is rotated, flexible material is wound around the liner 20 to form the reinforcing layer 22. The flexible material may be a resin impregnated filament which is wound around the liner 20 in a known manner similar to that disclosed in U.S. Pat. Nos. 5,499,739; 5,484,079; and 3,655,085. The disclosures in the aforementioned patents are hereby incorporated herein by this reference thereto. It should be understood that the flexible material which is wound around the liner 20 to form the reinforcing layer 22 could have any one of many different known compositions and can be wound in any one of many different known manners.

Once the reinforcing layer 22 has been formed around the liner 20 and the resin-impregnated material has hardened, the resulting filament wound container 10 (FIG. 1) is disconnected from the support members 44 and 46 (FIG. 4). The drive lug projections 40 and 42 connected with the plates 26 and 28 (FIG. 4) are exposed at opposite ends of the filament wound container 10. Thus, the projection 42 is surrounded by a recess 96 previously occupied by the support member 46 (FIG. 4) during winding of the reinforcing layer 22 around the liner 20.

It is contemplated that it will be desired to conceal the recess 96 and the projection 42. This may be accomplished by utilizing a cover, similar to the cover 102 of FIG. 5. The cover 102 has an arcuate configuration with a radius of curvature which matches the radius of curvature of the dome end portion 14 (FIG. 1) of the filament wound container 10.

A threaded projection 106 extends inward from a sidewall 108 of the cover 102. The projection 106 has a thread convolution which engages a thread convolution in the opening 60 on the projection 42. As the projection 106 is threaded into the opening 60 in the projection 42 on the plate 28, the side wall 108 of the cover 102 moves into sealing engagement with the exterior surface of the reinforcing layer 22 and provides the exterior of the domed end portion 14 of the filament wound container 10 with a pleasing appearance. Of course, a similar cover is provided to engage the projection 40 on the plate 26 at the opposite end of the filament wound container 10.

It should be understood that the cover 102 could be connected with the plate 28 in a different manner if desired. For example, the threaded projection 106 could be eliminated and a snap-on fastener utilized to connect the cover 102 with the plate 28. The snap-on fastener may engage the opening 60 in the projection 42. Alternatively, the snap-on fastener could engage the exterior of the projection 42 or the cover could also be affixed with adhesive.

In view of the foregoing description, it is apparent that the present invention provides a new and improved filament wound container 10. Opposite end portions 30 and 32 of the liner 20 are free of openings which receive winding tools. Therefore, the prior art problem of sealing openings formed in the liner 20 to enable the liner to be rotated during winding of filament around the liner is eliminated. Therefore, filament wound containers 10 constructed in accordance with the present invention have very few or no leakage problems.

In accordance with the present invention, during forming of a container 10, plates 26 and 28 are attached to opposite end portions 30 and 32 of a liner with adhesive 34 and 36. The liner surfaces to which the plates 26 and 28 are attached may be free of through openings to the interior of the liner 20. The liner 20 is supported for rotation about an axis 52 which extends through the plates 26 and 28 at opposite ends of the liner. The liner 20 is rotated under the influence of torque which is transmitted to the liner through at least one of the plates 26 or 28 and adhesive 34 or 36 attaching the one plate to the liner.

During rotation of the liner 20, flexible material is wound around the liner. The flexible material is wound over the plates 26 and 28 at the opposite ends of the liner. Covers 102 are advantageously connected with the plates 26 and 28 to cover the areas where the liner 20 was supported during winding of the flexible material around the liner.

Having described the invention, the following is claimed:

1. A method of forming a container for holding fluid, said method comprising the steps of providing a liner having first and second end portions, attaching a first plate to a first outer side surface of said first end portion via a first adhesive layer, attaching a second plate to a second outer side surface of said second end portion via a second adhesive layer, supporting the liner for rotation about a rotational axis which extends through the first and second end portions of the liner and through the first and second plates respectively attached thereto, supplying torque to at least said first plate attached to said first end portion of said liner, said torque being transmitted to said liner and being effective to rotate the liner about said rotational axis, and winding flexible material around the liner such that said flexible material is wound over at least a portion of each of said first and second end portions of the liner while the liner is being rotated under the influence said torque.

2. A method as set forth in claim 1, wherein said first adhesive layer is thicker in a peripheral region thereof adjacent a peripheral portion of said first plate, and is thinner in a central region thereof adjacent a central portion of said first plate.

3. A method as set forth in claim 1, said first and said second end portions of said liner each being free of through openings.

4. A method as set forth in claim 1, further comprising providing a first polygonal projection projecting axially outward from the first plate along said rotational axis, and engaging said first polygonal projection with a first rotatable member that is rotatable about said rotational axis, wherein said torque supplied to the first plate is supplied by said first rotatable member.

5. A method as set forth in claim 1, said liner having a weight of one hundred pounds or more, said weight being transmitted, through the first and second plates, to first and second rotatable support members respectively engaging said first and second plates.

6. A method as set forth in claim 1, further comprising the step of, prior to winding said flexible material, positioning a plurality of layers of material adjacent to the first and second plates with projections connected to the first and second plates extending through the plurality of layers, said liner being supported by first and second support members engaging said projections extending from said first and second plates respectively, said flexible material being wound over the plurality of layers of material adjacent said first and second end plates.

7. A method as set forth in claim 1 further including the steps of connecting a first cover member to the first plate after performing said step of winding flexible material around the liner and connecting a second cover member to the second plate after performing said step of winding flexible material around the liner.

8. A method as set forth in claim 1 wherein said step of winding flexible material includes winding the flexible material over the first and second plates.

9. A method of forming a container for holding fluid, said method comprising the steps of providing a liner having first and second end portions, attaching a first plate to a first outer side surface of the first end portion of the liner, said first end portion being free of through openings, attaching a second plate to a second outer side surface of the second end portion of the liner, said second end portion being free of through openings, supporting the liner for rotation about a rotational axis which extends through the first and second end portions of the liner and through the first and second plates, rotating the liner about the rotational axis under the influence of torque transmitted to the liner through at least the first plate, and winding flexible material around the liner, said step of winding flexible material around the liner includes winding the flexible material over the first and second plates and over the first and second end portions of the liner while the liner is being rotated.

10. A method as set forth in claim 9, wherein said step of supporting the liner for rotation includes engaging a first projection from the first plate with a first rotatable member which is rotatable about said rotational axis, and engaging a second projection from the second plate with a second rotatable member which is rotatable about said rotational axis.

11. A method as set forth in claim 9, wherein said first plate is attached to said first end portion of said liner with a first adhesive layer disposed therebetween, and wherein said second plate is attached to said second end portion of said liner with a second adhesive layer disposed therebetween.

12. A method as set forth in claim 9, said liner having a weight of one hundred pounds or more, said weight being transmitted, though the first and second plates, to first and second rotatable support members respectively.

13. A method as set forth in claim 9, further including the step of positioning a plurality of layers of material over the first and second plates prior to winding said flexible material around the liner.

14. A method as set forth in claim 2, wherein said second adhesive layer is thicker in a peripheral region thereof adjacent a peripheral portion of said second plate, and is thinner in a central region thereof adjacent a central portion of said second plate.

15. A method as set forth in claim 4, further comprising providing a second polygonal projection projecting axially outward from the second plate along said rotational axis, and engaging said polygonal projection with a second rotatable member that is rotatable about said rotational axis.

16. A method as set forth in claim 15, wherein additional torque is supplied to the second plate by said second rotatable member, said additional torque supplied to said second plate cooperating with said torque supplied to said first plate to drive said liner in rotation.

17. A method as set forth in claim 1, wherein said first adhesive layer has higher torsional strength than the torsional strength of said liner.

* * * * *